Figure 1:
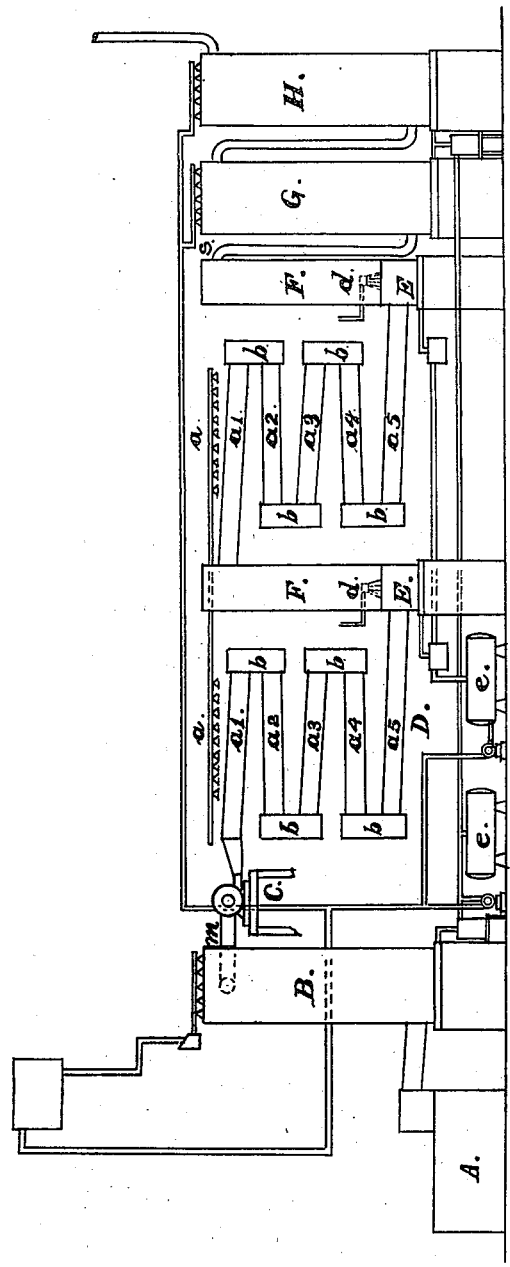

May 29, 1923.

T. R. HARNEY 1,457,164

METHOD AND APPARATUS FOR MANUFACTURING SULPHURIC ACID

Filed Nov. 1, 1921    2 Sheets-Sheet 1

Thomas R. Harney INVENTOR.

BY Merrell E Clark his ATTORNEYS.

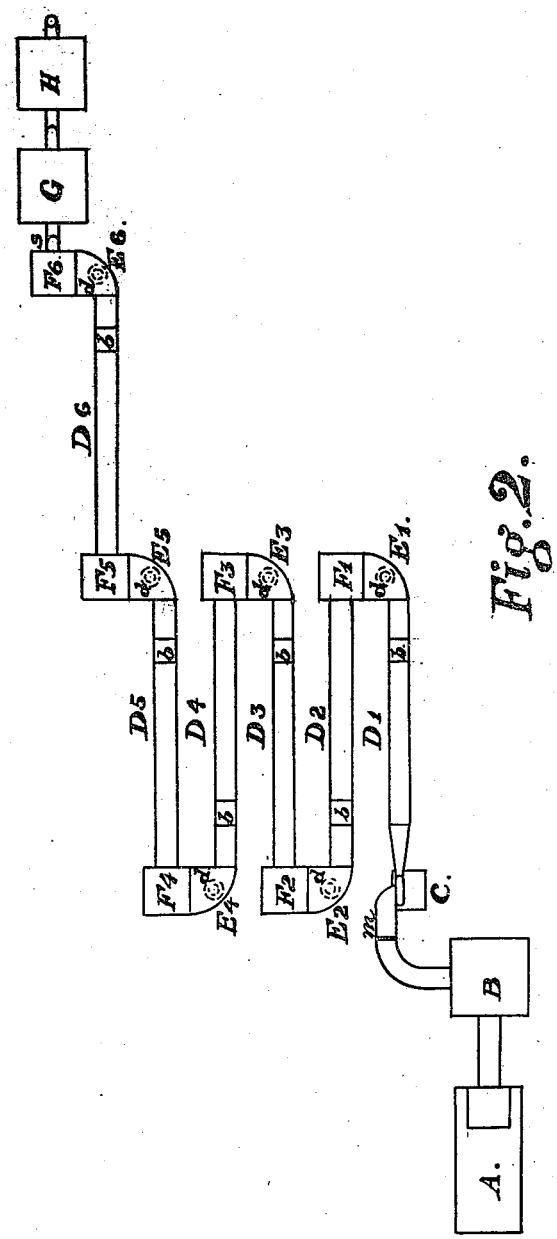

Patented May 29, 1923.

1,457,164

UNITED STATES PATENT OFFICE.

THOMAS R. HARNEY, OF SHORT HILLS, NEW JERSEY, ASSIGNOR TO NEW PROCESS ACID COMPANY, INC., OF NEW YORK, N. Y., A CORPORATION OF NEW YORK.

METHOD AND APPARATUS FOR MANUFACTURING SULPHURIC ACID.

Application filed November 1, 1921. Serial No. 512,000.

*To all whom it may concern:*

Be it known that I, THOMAS R. HARNEY, a citizen of the United States, residing at Short Hills, county of Essex, State of New Jersey, have invented certain new and useful Improvements in Methods and Apparatus for Manufacturing Sulphuric Acid; and I do hereby declare the following to be a full, clear, and exact description of the invention, such as will enable others skilled in the art to which it appertains to use the same.

Sulphuric acid is produced commercially by two well known general processes usually designated as the contact process and the chamber process. The operation of the contact process consists in general of the following necessary steps:—

(1st) The production of sulphur dioxide in the form of burner gases generally varying in content of sulphur dioxide between 3% and 8% by volume.

(2nd) The purification of said burner gases.

(3rd) The conversion of the sulphur dioxide contained in the purified burner gases to sulphuric anhydrid by bringing it into contact with a solid catalytic material.

(4th) The absorption of the sulphuric anhydrid thus produced in sulphuric acid.

The chamber process consists of the following steps:—

(1st) The production of sulphur dioxide in practically the same manner as in the contact process except that the strength of gas usually varies from 4% to 10% by volume.

(2nd) The utilization of the heat of the burner gases to de-nitrate the acid used to absorb the nitrogen compounds at the end of the system.

(3rd) The addition of nitric acid to the sulphur compounds.

(4th) The formation of sulphuric acid by the addition of water or steam to the sulphur gases as they are being reacted upon by the nitrogen compounds in the chambers.

(5th) The absorption in sulphuric acid of the nitrogen compounds carried forward in the gas to the end of the system.

The apparatus most generally used in the chamber process consists of large towers, lead chambers and necessary connecting flues. This apparatus occupies a relatively large space and ordinarily cannot be built on a scale to produce less than twenty tons of acid per day without excessive cost of operation.

The object of the present invention is to provide a process to produce sulphuric acid from sulphur dioxide efficiently in small sized units and an apparatus that can be constructed more cheaply and in a relatively smaller space than has hitherto been possible for the same production in chamber plants, and which adapts itself more readily to temperature control than does the ordinary chamber set, and at the same time avoid the expense of prior purification and treatment of the gases containing $SO_2$ or the use of solid catalyzers as required in the contact process.

The new process depends upon the use of oxides of nitrogen for oxidizing the sulphur dioxide as is the case in the chamber process, and the subsequent addition of water vapor to the resulting compound to form sulphuric acid. I have discovered, however, that the yield of acid per unit of cubical space used for the reaction can be materially increased by limiting the introduction of steam or water into the gas mixture stream as it passes through the system to certain definite points. To obtain the best results these points are preferably spaced far enough apart in the system to permit a certain quantity of the compound to be formed by the reaction between the sulphur gases and the oxides of nitrogen without this action being interfered with by the addition of steam or water. While this quantity of the compound will vary under different conditions, I have found generally that not more than one-half and not less than one-tenth of the total amount should be made between any two points of spraying. By limiting the introduction of the water or steam in this manner and at the same time regulating the temperature of the reacting gases, I find for any given capacity of sulphuric acid per day that the total cubical capacity required in a system working on my process will be less than one-fifth of that used in the best chamber practice. To accomplish the regulation of temperature of the gases during the reaction period, I resort to methods of cooling hereinafter described.

In practicing my invention the sulphur dioxide produced by any of the well known methods is allowed to react with the nitrogen oxides for a certain length of time, during which time no water or steam is added. Following this reaction the steam or water is injected into the system and the gases immediately subjected to a scrubbing action in which they come in contact with large surface areas. By means of surface condensation the sulphuric acid carried along with the gas is removed and the gases are prepared for the second stage of dry reaction. By continuing this operation through successive similar steps the reaction is carried practically to completion, so that the residual gases are of substantially the same composition as those which are found in the most efficient chamber plants. These residual gases can then be substantially freed of the nitrogen oxides by washing with the proper strength sulphuric acid, and this mixture of sulphuric acid and nitrogen compounds can be returned to the first scrubbing or hot tower, commonly called a Glover tower, where the nitrogen oxides are liberated for use in the reaction chambers. In this operation, as in the chamber plant process, there is always a small loss of nitrogen oxides which is made up in the same manner as in the chamber plants by the addition of new nitric acid.

In the accompanying drawing I have illustrated more or less diagrammatically one form of apparatus which embodies my invention and which is appropriate to the carrying out of my improved process.

Figure 1 represents a longitudinal elevation view of this apparatus, and Figure 2 represents a plan view thereof.

Referring to Figure 1, A represents a sulphur burner of any standard make such as can be used for the production of sulphur dioxide in any convenient manner by the combustion of native sulphur, iron pyrites, zinc blends, copper pyrites or any other material yielding sulphur dioxide; B represents a tower in all respects similar to the Glover tower used in the ordinary chamber process, and the action taking place in it is the same as that which ordinarily occurs in a Glover tower. This tower is constructed of and is packed with acid proof material. This packing is so arranged as to permit passage upward of the burner gases and the passage downward of a stream of acid.

$m$. represents a damper for the proper regulation of pressure in the Glover tower.

C represents a centrifugal fan of acid resisting material. This may be placed at any desired point in the unit but will usually be set so as to take the gases from the Glover tower and deliver them to the first dry reaction bank. It is here represented in this position. The gases may be moved by any other suitable means, such as by the natural draft due to the action of the Gay-Lussac tower (hereinafter described) as a stack, or to the construction of a substantial stack for the purpose of furnishing such natural draft.

D represents what I designate as a "dry reaction bank," it being understood that by "dry" I mean dry in the sense that no water or steam is introduced into such bank by outside means. This bank is a series of flues, $a_1$ $a_2$ $a_3$ $a_4$ $a_5$ which may be of any convenient size and length but will usually vary from twelve to thirty inches in inside diameter and from eight to thirty feet in length. The gases may be passed through two or more flues in parallel if desired, but will usually be handled as follows: Entering the first flue of a bank the gases after traversing its length will pass into the second flue of the same bank through any suitable connection, such as elbows or a header box. This second flue will usually lie parallel to and side by side with the first and the flow of gases will consequently be in the opposite direction to the flow in the first flue. Upon leaving this second flue the gases will pass through a connection to the third which will usually lie parallel to the first two, and so on through any desired number of flues constituting the first bank. This number will usually be five, and they may lie in the same vertical plane, the same horizontal plane, or be arranged in any other manner deemed advisable.

$q$. represents a means of spraying cooling water over the dry reaction bank for the purpose of temperature control.

E represents what I designate as a hydration box. This box is of acid resisting material and used to connect the reaction bank D with the condenser F. It is in this box that the water or steam is added to the gas through the spray nozzle $d$.

F represents the condenser. This condenser may be constructed of and packed with any suitable acid-resisting materials and may be of any convenient size, but will usually have approximately the same volume, including packing, as a dry reaction bank. The packing should be so arranged as to permit of the passage of the gases which may enter at the bottom or at the top as desired, but will usually enter at the bottom. By means of an acid seal trap or other suitable device which permits the outflow of acid while preventing the inflow of air, the acid condensed in the condenser is withdrawn and lead through pipes or troughs of acid resisting material to receiving tank $e$.

$D_1$ $D_2$ $D_3$ $D_4$ represent successive reaction banks and $E_1$ $E_2$ $E_3$ $E_4$ and $F_1$ $F_2$ $F_3$ $F_4$ represent successive hydration boxes and condensers.

G represents a tower similar to the Glover tower B, but of somewhat greater volume. It is made and packed with acid resisting material and is arranged so that the gases can pass upward through the tower and acid can be sprayed down it. The action of these towers is similar to those commonly called Gay-Lussac towers in a chamber system. On the drawing there are two of these towers shown in series G and H. It may be advisable to use two or more and to use them either in series or in parallel.

S represents a damper for the proper regulation of pressure in the Gay-Lussac tower.

The operation of the process is as follows:—

The gases coming from the burner A drawn by the fan C containing the oxides of sulphur and principally the dioxide, are drawn through the flue into the tower B. In this tower, they come in contact with a stream of sulphuric acid. This downflow stream of acid consists of a mixture of nitrous vitriol, that is, acid obtained by scrubbing the exit gases as is hereinafter described, acid of approximately 50° Bé. called chamber acid produced in the condenser F, usually a small amount of nitric acid, and sometimes a small amount of water. In some cases, it may not be desirable to pass nitric acid down this first tower. It will then become necessary to supply nitrogen oxides from some other source. This may be accomplished—

(1) by heating a mixture of nitrate such as sodium nitrate and sulphuric acid in a pot or still which delivers the oxides generated to the stream of sulphur dioxide from the burners, or (2) by the introduction, into the stream of sulphur dioxide, of synthetic nitrogen oxides formed by the fixation of atmospheric nitrogen.

The action in this tower is the same as that ordinarily taking place in a Glover tower and consists of—

(1) the breaking up of the nitric acid and the denitrating of the nitrous vitriol by the heat of the entering burner gases, thus freeing nitrogen oxides for use in the apparatus to be described later;

(2) the concentration o' the weaker chamber acid from approximately 50° Bé., at which it enters, to approximately 60° Bé. by the action of the heat contained in the burner gases; and (3) the formation of a certain amount of sulphuric acid due to the interaction of sulphur dioxide from the burner gases with the nitrogen oxides and the subsequent breaking up of the compound formed by the action of the water driven off of the chamber acid.

The acid coming from the tower is caught in the cooler. Part of it is taken from this cooler to suitable storage space, and the remainder is used for spraying the towers marked G and H which are used for absorbing the nitrogen oxides. The gases leaving the tower are forced through the flue system D by means of the fan C. This gas, then, is a mixture of sulphur dioxide, nitrogen oxide, nitrogen, oxygen and a certain amount of water vapor. In passing through these flues or dry reaction banks, there is a thorough mixing of the reacting gases with a consequent comparatively rapid formation conversion of the sulphur compounds to a higher state of oxidation. As this reaction is exothermic it is necessary to provide for cooling the gases. This is accomplished by the air cooling to which the flues are subjected, and also cooling them by external water sprays. This reaction is allowed to proceed in the flues until not less than 10% of the sulphur dioxide has been converted into a higher state of oxidation.

As the reaction above described proceeds, the system will approach a balanced condition so that the action of the sulphur dioxide with the nitrogen oxides toward the end of the reaction bank or flue system will be slower than at the beginning. Upon leaving the last flue of a bank, the gases enter a small chamber which I call a hydration box E. At this point, water is introduced in the form of a spray or of steam. The effect of this water is to break up the gaseous compound with the consequent formation of sulphuric acid and nitrogen trioxide. The gases, immediately after hydration, pass through the condenser F where they are subjected to the scrubbing action of large surfaces and where, as a result, the sulphuric acid is condensed. This acid which is condensed is withdrawn from the bottom of the condenser to suitable receiving tanks. This acid constitutes the chamber acid mentioned before which is usually further treated by passing over the Glover tower B. I have found that to obtain the best results in the condenser, the supply of water introduced into the hydration box should be so regulated as to produce a sulphuric acid of a specific gravity ranging from 48° to 53° Bé. Upon leaving the first condenser the gases are led into the first flue of the second reaction bank. The action of the condenser has been to remove the greater part of the compound of a higher state of oxidation so that the system of the acting gases is now again unbalanced and the action of the nitrogen oxides on the sulphur dioxide in the gas proceeds with renewed activity. At the end of the second dry reaction bank the gases pass through another hydration box and condenser where the same conditions are maintained as in the first.

After leaving the last condenser the gases, now practically free of sulphur dioxide, are passed through the tower or towers, G, H, where it has circulated over it a stream of sulphuric acid of approximately 60° Bé., which is a portion of the acid heretofore mentioned as being withdrawn from the cooler of the Glover tower. The action of this is to form nitrous vitriol with the nitrogen oxides contained in the spent gases. This nitrous vitriol is then returned to be passed over the packing of the Glover tower B, where the heat of the entering burner gases sets free the nitrogen oxides for the use as described before.

In operating this process, it is controlled by observation of the temperature at various points throughout the unit and observations of the strength of acid used at certain points, such as the circulation streams on the Glover and Gay-Lussac towers, and also observations of the strength of acid being delivered at certain points, such as the condensers and the Glover and Gay-Lussac towers. Further, the control of the operation is obtained by making tests of the circulating gases at various points in the unit to determine the content of sulphur dioxide, nitrogen oxides, oxygen or total acidity in such gases and tests of the nitrous vitriol delivered from the Gay-Lussac tower or that used on the Glover tower with respect to its content of nitrogen compounds.

As the apparatus required for the operation of this process is large or small, according to the amount of sulphuric acid to be made, I do not wish to limit myself to any particular number of reaction banks or condensers, nor to the size of those used. Nor do I wish to limit myself to the position of the reaction banks to that which I have shown in the drawings. These banks may be either in the same horizontal plane or in the same vertical plane as I have shown them. Similarly, while, as above noted, I deem it preferable to place the moisture-adding means at the far end of each bank of flues, it is, of course, within the scope of my invention to place these means in other positions relative to the flues, the essential consideration being that at least a material part of the reaction which takes place within each bank of flues be permitted to take place prior to the addition of moisture from external sources.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. The method of producing sulphuric acid from a gas containing sulphur dioxide, which consists in introducing into said gas nitrogen oxides, then passing said gases through a relatively long circuitous passage to convert the sulphur compound to a higher state of oxidation, then adding water from an external source, then subjecting the gaseous mixture thus formed to the scrubbing action of large surfaces to form sulphuric acid, then removing the sulphuric acid thus formed, then passing the remaining gases through a relatively long circuitous passage, and forming and removing sulphuric acid therefrom as above described.

2. The method of producing sulphuric acid from a gas containing sulphur dioxide, which consists in introducing into said gas nitrogen oxides, then passing said gas through a relatively long circuitous passage to convert the sulphur compound to a higher state of oxidation and removing part of the heat generated by the reaction by cooling, then adding water from an external source, then subjecting the gaseous mixture so formed to the scrubbing action of large surfaces to form sulphuric acid, then removing substantially all the sulphuric acid thus formed, then passing the remaining gases through a relatively long circuitous passage, and forming and removing sulphuric acid therefrom as above described.

3. The method of producing sulphuric acid from a gas containing sulphur dioxide, which consists in introducing into said gas nitrogen oxides, then passing said gases through a relatively long circuitous passage to convert not less than ten percent of the sulphur dioxide to a higher state of oxidation, then adding water from an external source, then subjecting the gaseous mixture thus formed to the scrubbing action of large surfaces to form sulphuric acid, then removing the sulphuric acid thus formed, then passing the remaining gases through a relatively long circuitous passage, and forming and removing sulphuric acid therefrom as above described.

4. The method of producing sulphuric acid from a gas containing sulphur dioxide, which consists in introducing into said gas nitrogen oxides, then passing said gas through a relatively long circuitous passage to convert the sulphur compound to a higher state of oxidation, removing part of the heat generated by the reaction by cooling and adding moisture to the gases from an external source, then subjecting the gaseous mixture so formed to the scrubbing action of large surfaces to form sulphuric acid, removing substantially all the sulphuric acid thus formed, then passing the remaining gases through a relatively long circuitous passage and forming and removing sulphuric acid therefrom as above described, and then recovering the remaining compounds and employing them as a source of supply of nitrogen oxides for the first mentioned reaction.

5. The method of producing sulphuric acid from a gas containing sulphur dioxide, which consists in introducing into said gas nitrogen oxides, then passing said gas through a relatively long circuitous passage to convert the sulphur compound to a higher state of oxidation, then adding water from an external source, then subjecting the gaseous mixture so formed to the scrubbing action of large surfaces to form sulphuric acid, removing substantially all the sulphuric acid thus formed, passing the remaining gases through a relatively long circuitous passage and forming and removing sulphuric acid therefrom as above described, and then removing the remaining compounds and employing them as a source of supply of nitrogen oxides for the first mentioned reaction.

6. The method of producing sulphuric acid from a gas containing sulphur dioxide, which consists in introducing into said gas nitrogen oxides, then passing said gas through a relatively long circuitous passage to convert the sulphur compound to a higher state of oxidation and then removing part of the heat generated by the reaction by cooling, then adding water from an external source, then subjecting the gaseous mixture so formed to the scrubbing action of large surfaces to form sulphuric acid, removing substantially all the sulphuric acid thus formed, passing the remaining gases through a relatively long circuitous passage and forming and removing sulphuric acid therefrom as above described, and then removing the remaining compounds and employing them as a source of supply of nitrogen oxides for the first mentioned reaction.

7. An apparatus for producing sulphuric acid from a gas containing sulphur dioxide and nitrogen oxides, which consists of a series of banks of flues, means associated with each bank of flues for adding moisture to the gas passing therethrough, a condensing tower containing baffling surfaces of large area, located at the far end of each bank of flues for forming sulphuric acid and a device into which the gas from the last condensing tower passes and wherein said gas is subjected to the action of sulphuric acid, for the purpose described.

8. An apparatus for producing sulphuric acid from a gas containing sulphur dioxide and nitrogen oxides, which consists of a series of banks of flues, means for controlling the temperature of said flues and gases therein, means associated with each bank of flues for adding moisture to the gas passing therethrough, a condensing tower containing baffling surfaces of large area, located at the far end of each bank of flues for forming sulphuric acid and a device into which the gas from the last condensing tower passes and wherein said gas is subjected to the action of sulphuric acid, for the purpose described.

9. An apparatus for producing sulphuric acid from a gas containing sulphur dioxide and nitrogen oxides, which consists of a series of banks of flues, means for controlling the temperature of said flues and gases therein, means associated with each bank of flues for adding moisture to the gas passing therethrough, a condensing tower containing baffling surfaces of large area, located at the far end of each bank of flues for forming sulphuric acid, means for removing the sulphuric acid formed in each of said towers, and a device into which the gas from the last condensing tower passes and wherein said gas is subjected to the action of sulphuric acid for the purpose described.

THOMAS R. HARNEY.